(12) United States Patent
Pettingale

(10) Patent No.: US 8,209,934 B2
(45) Date of Patent: Jul. 3, 2012

(54) WALL TIE AND METHOD OF USING AND MAKING SAME

(76) Inventor: Alan Pettingale, Melissa, TX (US)

( * ) Notice: Subject to any disclaimer, the term of this patent is extended or adjusted under 35 U.S.C. 154(b) by 256 days.

(21) Appl. No.: 12/378,854

(22) Filed: Feb. 20, 2009

(65) Prior Publication Data
US 2010/0212249 A1 Aug. 26, 2010

(51) Int. Cl.
E04B 1/38 (2006.01)
E04B 1/00 (2006.01)
B23P 17/04 (2006.01)

(52) U.S. Cl. ........... 52/712; 52/379; 52/513; 52/698; 411/389

(58) Field of Classification Search ........... 52/379, 52/513, 698, 712, 713, 705; 411/388, 389, 411/82, 82.1
See application file for complete search history.

(56) References Cited

U.S. PATENT DOCUMENTS

| | | | | |
|---|---|---|---|---|
| 1,144,700 A * | 6/1915 | Edwards | | 411/371.1 |
| 2,329,550 A * | 9/1943 | Mentesana et al. | | 52/703 |
| 3,890,758 A * | 6/1975 | Bouchard | | 52/713 |
| 4,350,464 A * | 9/1982 | Brothers | | 411/180 |
| 4,604,846 A * | 8/1986 | Ekstrom | | 52/704 |
| 4,764,069 A * | 8/1988 | Reinwall et al. | | 411/397 |
| 4,772,166 A * | 9/1988 | Shamah et al. | | 411/32 |
| 4,883,396 A * | 11/1989 | Shamah et al. | | 411/55 |
| 4,975,008 A * | 12/1990 | Wagner | | 411/337 |
| 5,085,026 A * | 2/1992 | McGill et al. | | 52/745.21 |
| 5,154,559 A * | 10/1992 | Wagner | | 411/107 |
| 5,415,507 A * | 5/1995 | Janusz et al. | | 411/5 |
| 5,553,436 A * | 9/1996 | Kish et al. | | 52/704 |
| 5,636,486 A * | 6/1997 | Hall | | 52/383 |
| 5,644,889 A * | 7/1997 | Getz | | 52/713 |
| 5,711,132 A * | 1/1998 | Kish et al. | | 52/704 |
| 6,099,196 A * | 8/2000 | Lancelot, III | | 403/313 |
| 7,309,199 B2 * | 12/2007 | Ayrle | | 411/82 |
| 7,980,801 B2 * | 7/2011 | Kawano | | 411/402 |
| 2002/0100239 A1 * | 8/2002 | Lopez | | 52/379 |
| 2005/0097849 A1 * | 5/2005 | Hayes | | 52/698 |
| 2005/0244244 A1 * | 11/2005 | Ayrle | | 411/82 |
| 2005/0279042 A1 * | 12/2005 | Bronner | | 52/513 |
| 2008/0148664 A1 * | 6/2008 | Hayes | | 52/379 |
| 2008/0175689 A1 * | 7/2008 | Vagedes | | 411/487 |
| 2009/0133357 A1 * | 5/2009 | Richards | | 52/698 |
| 2011/0047919 A1 * | 3/2011 | Hohmann, Jr. | | 52/513 |
| 2011/0272556 A1 * | 11/2011 | Lin | | 249/190 |

* cited by examiner

*Primary Examiner* — Basil Katcheves
*Assistant Examiner* — Rodney Mintz

(57) ABSTRACT

A wall tie being a steel rod having a first end and a second end, the first end having a tapered helical screw with a crimped stop located a predetermined length from the end thereof, the crimped stop adapted to retain a stopping means, e.g., a washer. The washer serves as a depth gauge such that when the wall tie is screwed into a stud and the washer reaches the stud it acts as a stop preventing the wall tie from further penetrating the stud.

11 Claims, 3 Drawing Sheets

WALL TIE AND METHOD OF USING AND MAKING SAME

CROSS REFERENCE TO RELATED APPLICATIONS

Not Applicable

TECHNICAL FIELD

The invention relates to wall ties used to couple masonry and brick veneers to stud backings.

BACKGROUND OF THE INVENTION

As buildings get older, or as they suffer damage, they may require strengthening so as to avoid collapse, using, inter alia, masonry pinning and retrofit anchors. Such re-anchoring could be required due to poor brick tie configuration, wall tie deterioration, loosening walls, walls lacking lateral support or wall movement problems. Although expensive, reanchoring a brick veneer usually costs much less than removing and rebuilding the wall. Anchors or wall ties installed from the outside leave only small holes that are easily filled with color matched mortar or caulk. Wall ties are typically used to perform these tasks. Typically, wall ties perform three primary functions: provide a connection, transfer lateral loads, and permit in-plane movement to accommodate differential movements and, in some cases, restrain differential movement.

For a wall tie to fulfill these functions, it must be securely attached to the brick and masonry veneer and its backing, have sufficient stiffness to transfer lateral loads with minimal deformations, have a minimum amount of mechanical play, be corrosion-resistant and be easily installed to reduce installation errors and damage to the tie system.

Helical screw wall ties are known to be used as wall ties between brick and mortar veneers and studs. Typically, such helical screw wall ties consist of a steel rod having two ends, a helical screw portion on the first end and a bolt portion on the second end. When using a helical screw wall tie into a stud, three general types of anchors are used on the bolt end to anchor the wall tie to the mortar: adhesive; a mechanical expansion, or a nut assembly.

Most adhesive anchors are installed in similar ways, using an epoxy or polyester adhesive. First a hole is drilled, the drilling dust is removed, the helical screw wall tie is inserted into the hole and into the stud. A steel screen tube is filled with adhesive and the filled screen inserted in the hole. Inserting the steel screen over the steel rod pushes the adhesive through the screen into the pores of the masonry. This bonds the masonry and the steel rod together. Well known in the industry are both epoxy and polyester adhesives.

Mechanical anchors are also known as expansion anchors. To install an expansion anchor, a hole is drilled in the mortar joint. Once the helical screw is inserted into the stud, the expansion anchor is screwed onto the steel rod. The expansion anchor is torqued to be secured to the mortar. The torquing device is then removed Most mechanical anchors work by expanding a metal sleeve until the sleeve grips the inside of the drilled hole. In hollow masonry backups, the expanded sleeve may grip the back of the hole.

In the third type of anchor, a nut assembly, such as a nut and washer, toggle or the like, having a diameter greater than the hole is screwed onto the second end of the steel rod and torqued.

Regardless of the anchoring used, a disadvantage of the helical screw system is that the wood screw typically has a length longer than the stud into which it is screwed. Not only can this cause the wall tie to penetrate through interior finishes, a dangerous situation can develop if the helical end extends beyond the stud and into, e.g., electrical wires, flexible gas lines, and the like. What is desired is an improved wall tie that is adapted to avoid the damage and danger associated with a conventional helical screw wall ties.

SUMMARY OF THE INVENTION

The described embodiment comprises a wall tie being a steel rod having a first end and a second end, the first end having a tapered helical screw with a crimped stop located a predetermined length from the end thereof, the crimped stop adapted to retain a stopping means, e.g., a washer. The washer serves as a depth gauge such that when the wall tie is screwed into the stud, such as a wood or a metal stud, and the washer reaches the stud it acts as a stop preventing the wall tie from further penetrating the stud. Hence, with knowledge of the width of the stud, wall ties having a crimped stop and washer located a distance from the first end less than such width are operable to prevent the wall tie from penetrating through the stud. The second end of the steel rod can be smooth or can be threaded and adapted to receive an adhesive, mechanical or nut assembly anchor.

To those skilled in the art to which this invention relates, many changes in construction and widely differing embodiments and applications of the invention will suggest themselves without departing from the scope of the invention as defined in the claims. The disclosures and the descriptions herein are purely illustrative and are not intended to be in any sense limiting.

BRIEF DESCRIPTION OF THE DRAWINGS

For a better understanding of the described embodiment including the features, advantages and specific embodiments, reference is made to the following detailed description along with accompanying drawings in which.

References in the detailed description correspond to like references in the Figures unless otherwise noted. Like numerals refer to like parts throughout the various Figures.

DETAILED DESCRIPTION OF THE PREFERRED EMBODIMENTS

While the making and using of the described embodiment are discussed in detail below, it should be appreciated that the invention provides many applicable inventive concepts which can be embodied in a wide variety of specific contexts. Some features of the embodiments shown and discussed may be simplified or exaggerated for illustrating the principles of the invention.

Figure 1:
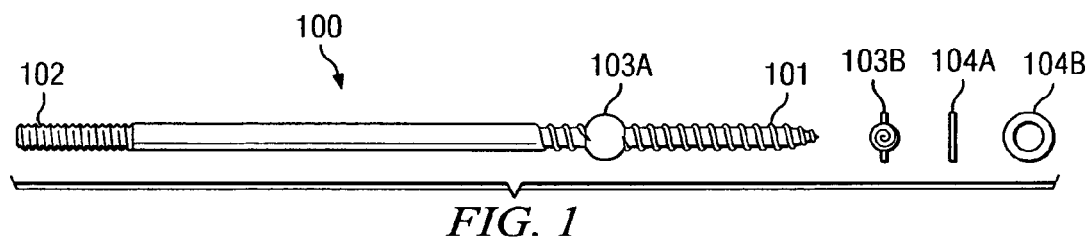
FIG. 1 is an illustration of the described embodiment and the components thereof.

Referring now to FIG. 1, wall tie 100 comprises a rod having a first end 101 with a tapered helical screw portion along a predetermined, longitudinal length thereof and a second end 102. A crimped stop 103A (seen in a front view as 103B) is located a predetermined length from the first end thereof, the crimped stop 103A adapted to retain, e.g., a washer 104A (seen in a front view as 104B). The washer 104A is inserted over the first end 101 of the rod and is positioned at the crimped stop 103A, the face of washer 104A being orthogonal to the longitudinal axis of the rod. In preferred embodiments, the rod is 6 to 12 inches long, the tapered helical screw on the first end being about ⅕ to ½ of the length of the rod, the stop being located at about the ¼ to ¾ of the distance of the length of the helical screw portion from the first end, the bolt portion on the second end being about ⅕ to ⅜ of the length of the rod.

Figure 2:
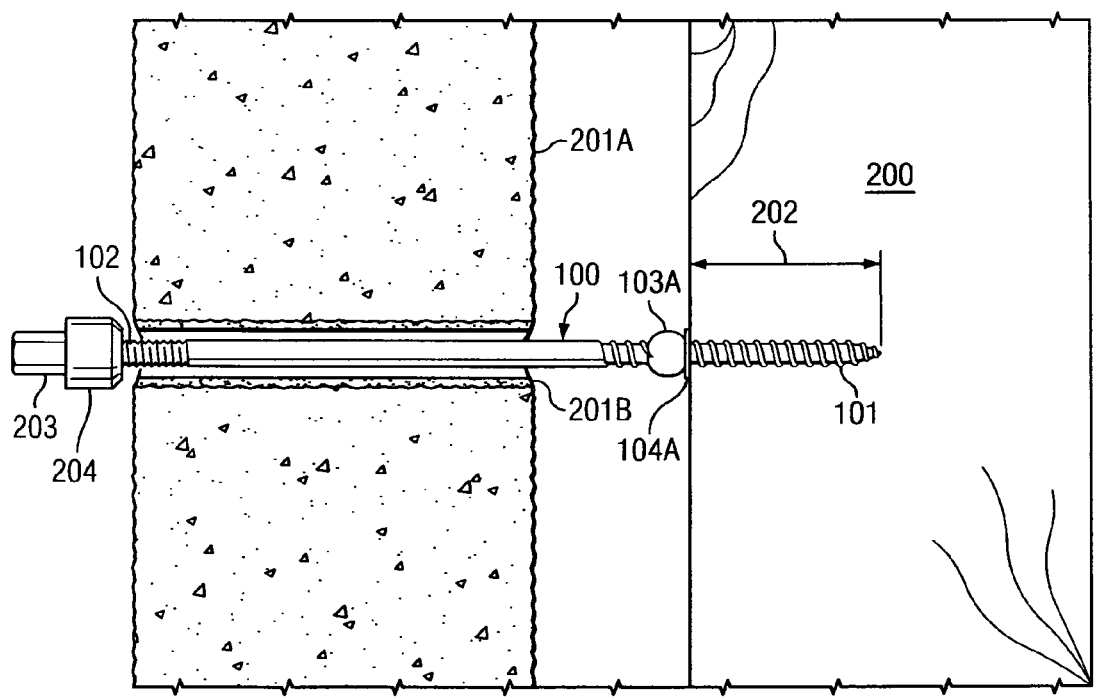
FIG. 2 is a cross sectional view of a brick and mortar veneer and stud backing illustrating the described embodiment being installed into the stud.

FIG. 2, is a cross sectional view of a brick 201A and mortar 201B veneer and stud 200, shown here as a wood stud, but the described embodiment being adapted to be used in other stud compositions such as metal studs, illustrating wall tie 100 screwed into the stud 200. As seen therein, washer 104A serves as a depth gauge in that when the wall tie 100 is screwed into the stud 200, when the washer 104A reaches the stud 200, it acts as a stop, preventing the wall tie 100 from further penetrating the stud 200. Hence, with knowledge of the width of the stud 200, a wall tie 100 having a crimp and washer located a distance 202 from the first end of the wall tie 100 less than such stud width prevents the wall tie 100 from penetrating through stud 200. The second end 102 of the steel rod can be smooth or can be threaded as seen in FIG. 2 and adapted to receive a stopping means comprised of an adhesive, mechanical or nut assembly anchor 204.

Installation of the wall tie 100 is accomplished by drilling a hole in the mortar 201B joint of the brick 201A veneer. The wall tie 100 is installed into the stud 200 with a drill motor by means of a hexagonal bit 203 that screws wood tie 100 into the wood wall stud 200 until washer 104A stops at the wood wall stud 200 when the proper penetration 202 has been reached. The drive bit is then backed off from the wall tie 100 from the machine threads 102 so that the hole created in the brick mortar 201B, by this installation, can be filled with, e.g., an adhesive such as an epoxy resin to secure the anchor to the brick veneer, or a stopping means comprised of a mechanical or nut assembly anchor 204.

Figure 3:
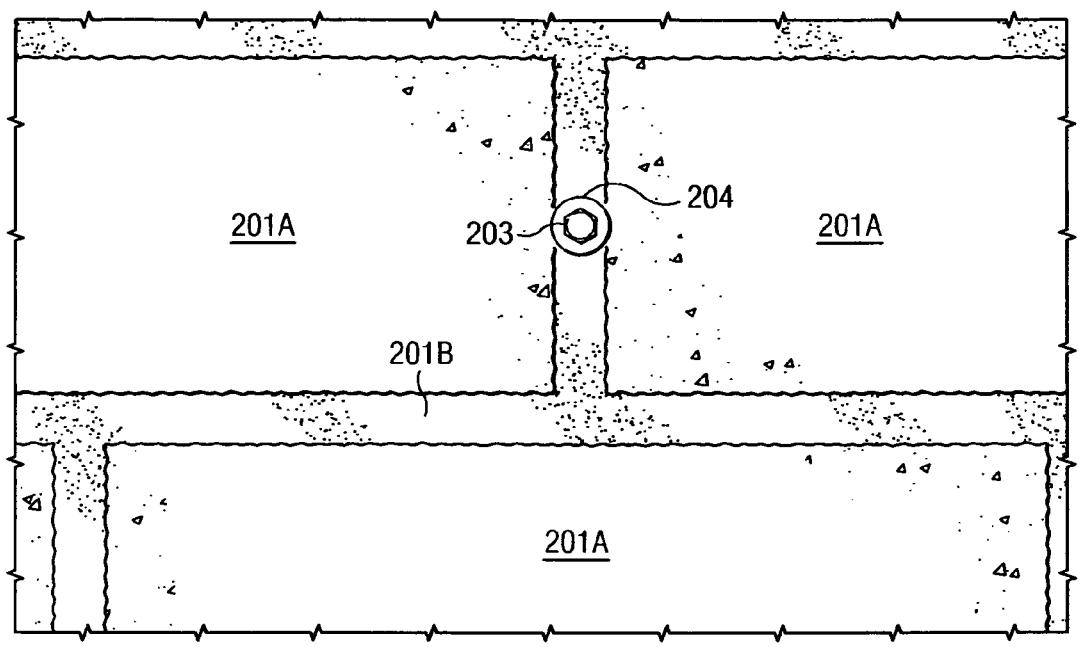
FIG. 3 is a front view of a brick and mortar veneer with the described embodiment installed.
Figure 4:
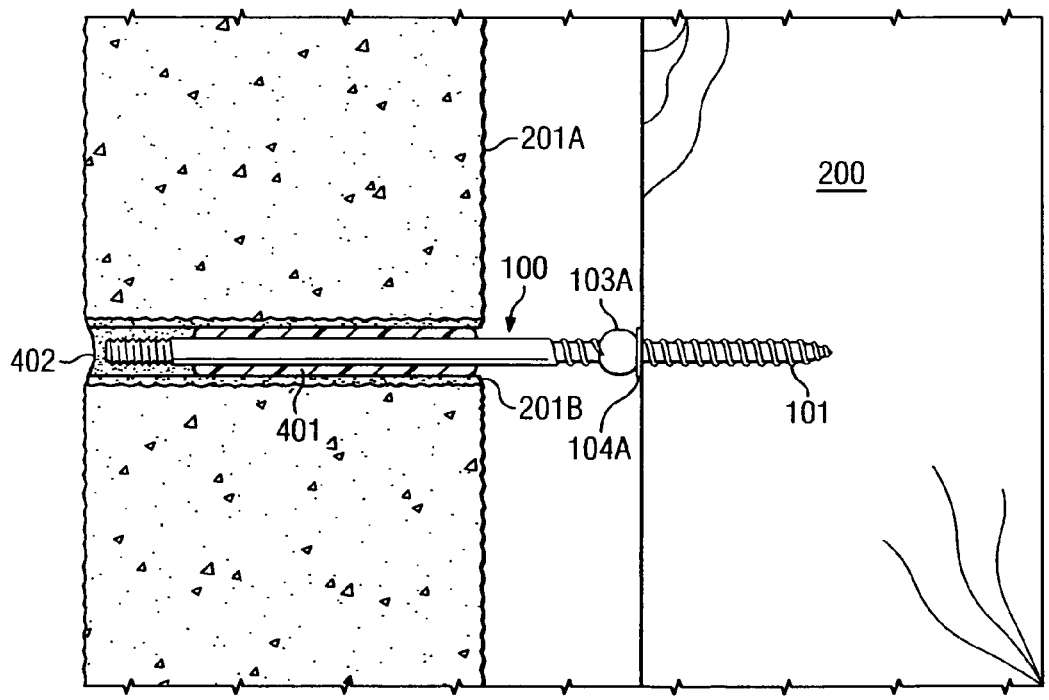
FIG. 4 is a cross sectional view of a brick and mortar veneer with the described embodiment anchored into the hole using a rosin fill adhesive with the end tuck pointed.
Figure 5:
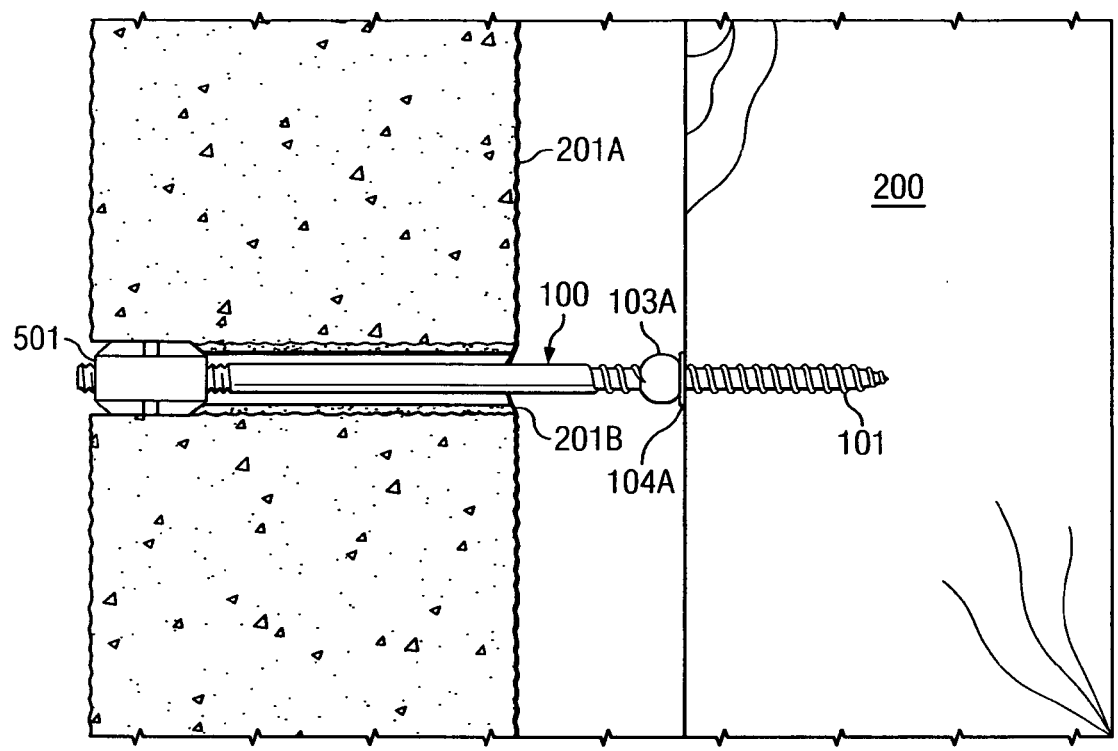
FIG. 5 is a cross sectional view of a brick and mortar veneer with the described embodiment anchored into the hole using a mechanical anchor.
Figure 6:
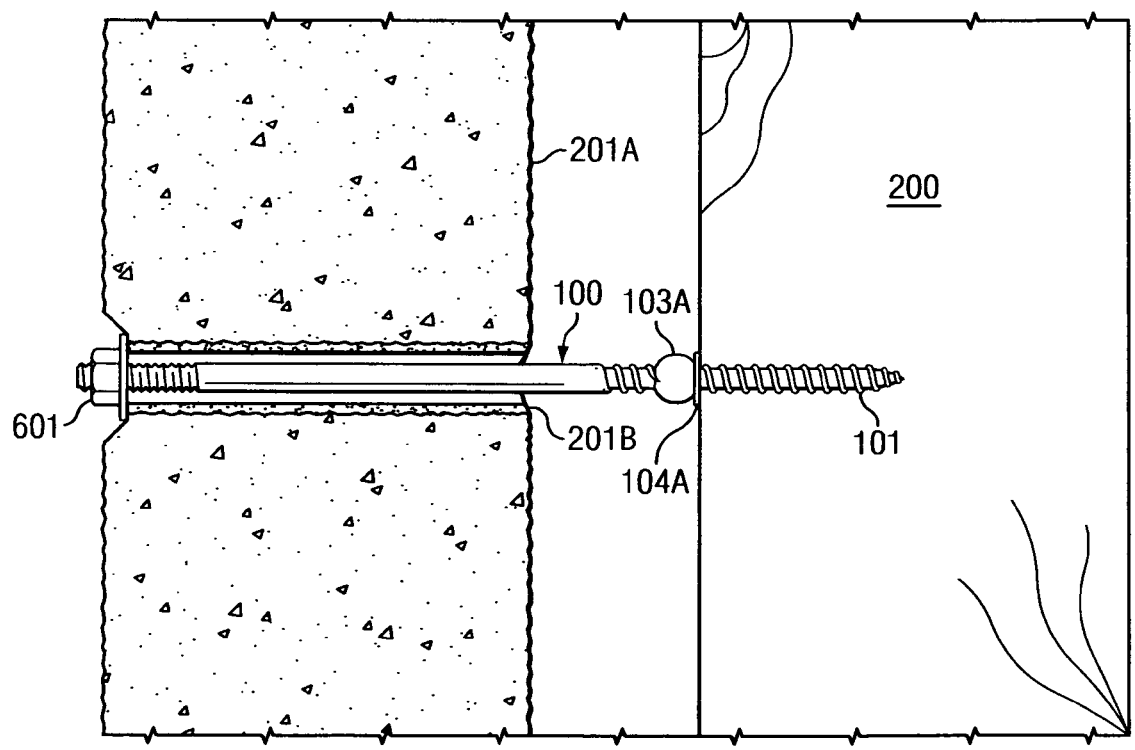
FIG. 6 is a cross sectional view of a brick and mortar veneer with the described embodiment anchored into the hole using a nut assembly.

FIG. 3 is a front view of the installation as described in FIG. 2. In FIG. 4, an epoxy resin anchor 401 is seen coupled to the steel rod of the wall tie 100. A portion 402 of the removed mortar is left open at the end to allow color matched mortar to be applied to conceal the anchor installation. In FIG. 5, a mechanical anchor 501 is seen coupled to the bolt portion of the second end 102. In FIG. 6, a threaded nut assembly anchor 601 is seen coupled to the bolt portion of the second end 102.

An alternative embodiment of the invention comprises a rod having a first end and a second end, the first end having a tapered helical screw portion along a predetermined longitudinal length thereof, the first end further having, along a predetermined length of the tapered helical screw portion, a stop. A stopping means having a predetermined diameter is inserted into the rod and positioned at the stop. In such embodiment, the stopping means can be a nut positioned over the first end of the rod and positioned at the stop.

The method of making the described embodiment comprises fabricating a tooling that is adapted to receive a conventional wall tie having a helical screw portion thereof, the tooling having therein a void to accept the steel rod with a portion of the void being dimensioned to cause the formation of a crimp when the tooling is inserted in a stamping or crimping machine, placing such helical portion of the steel rod in tooling, compressing, by the stamping or crimping machine, the tooling, thus causing the steel rod to form the crimp in the steel rod and positioning a stopping means, such as a washer, at the crimped stop.

The embodiments shown and described above are only exemplary. Even though numerous characteristics and advantages have been set forth in the foregoing description together with details of the making the preferred embodiment, the disclosure is illustrative only and changes may be made within the principles of the invention to the full extent indicated by the broad general meaning of the terms used in the claims.

What is claimed is:

1. A wall tie, comprising:
a rod having a first end and a second end;
the first end having a tapered helical screw portion along a predetermined longitudinal length thereof, said tapered helical screw portion commencing at a tip of the first end thereof;
the first end further having, along a predetermined length of the tapered helical screw portion an integral, immovable crimped stop, the crimped stop formed as part of the rod in a crimping process, the rod and the crimped stop being a continuous unitary structure of one-piece construction, the crimped stop located a predetermined distance between the first end of the rod where the tapered helical screw portion commences and the end of the predetermined length of the helical screw portion; and
a washer having a predetermined diameter inserted over the first end of the rod and positioned next to and abutting the crimped stop, the face of washer being orthogonal to the longitudinal axis of the rod, the wall tie being operable to force the washer into direct contact with the crimped stop by pressure applied by an interior wall element when the wall tie is installed.

2. The wall tie of claim 1, further comprising a nut positioned at the washer proximate the first end of the rod.

3. The wall tie of claim 1, wherein the crimped stop and the washer prevent the first end of the rod from penetrating through a stud.

4. The wall tie of claim 1, wherein the rod is made of steel.

5. The wall tie of claim 1, wherein the second end is configured to receive an adhesive anchor.

6. The wall tie of claim 5, in combination with an adhesive anchor wherein the adhesive is an epoxy resin operable to establish a bond with a brick veneer to provide lateral stabilization.

7. The wall tie of claim 5, in combination with an adhesive anchor wherein the adhesive is a polyester adhesive.

8. The wall tie of claim 1, wherein the second end is configured to receive a mechanical anchor.

9. The wall tie of claim 8, in combination with a mechanical anchor wherein the mechanical anchor is an expansive device that secures against the brick by friction and pressure.

10. The wall tie of claim 1, wherein the second end is configured with threads to receive a nut assembly anchor.

11. The wall tie of claim 10, in combination with a nut assembly anchor.

* * * * *